United States Patent Office 3,238,785
Patented Mar. 8, 1966

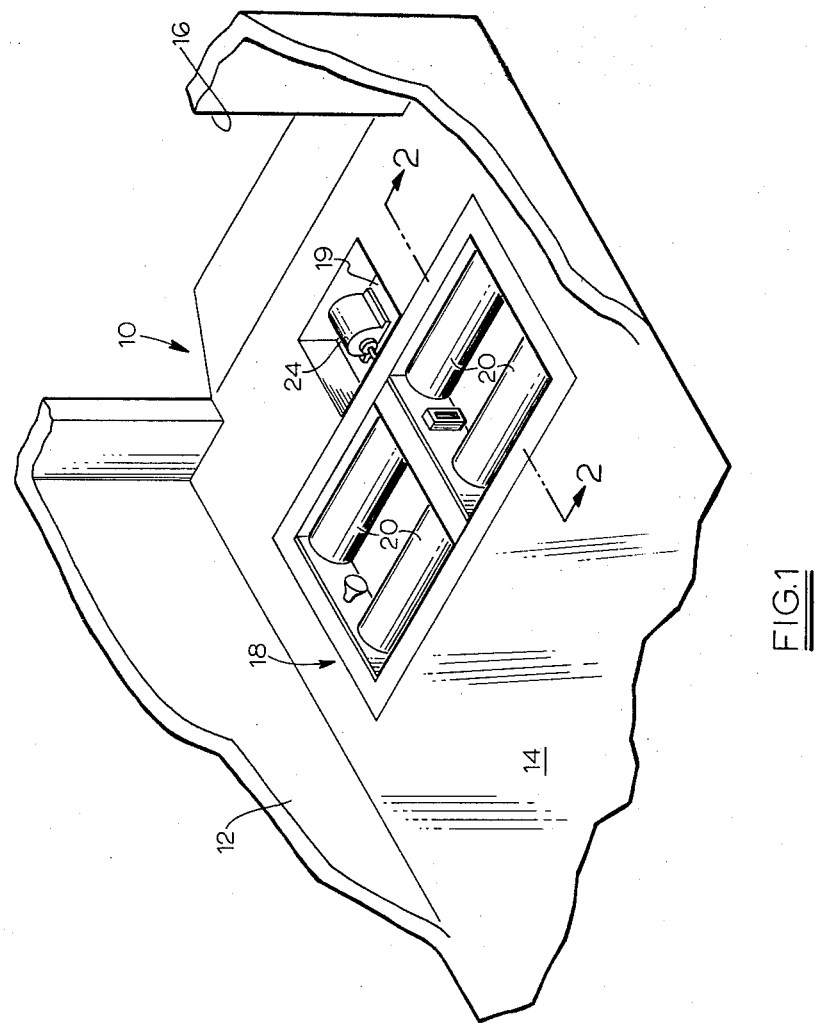

3,238,785
WHEEL UNBALANCE DETECTION
William S. Lodge, Mount Royal, N.J., and Fernando A. Pellicciotti, Inglewood, Calif., assignors to Socony Mobil Oil Company, Inc., a corporation of New York
Filed Nov. 30, 1962, Ser. No. 241,253
16 Claims. (Cl. 73—457)

This invention relates to an apparatus for detecting wheel unbalance, and more particularly, to such apparatus especially suitable for use with a dynamometer in a vehicle diagnostic system.

In a copending application of George B. Myrtetus and Charles H. Pancoast, Serial No. 241,214, filed November 30, 1962, which has been abandoned in favor of a continuation-in-part application Serial No. 276,702 of George B. Myrtetus and Charles H. Pancoast, filed April 30, 1963, entitled Diagnostic Line Method for Large Numbers of Automotive Road Vehicles, which contains substantially all of the disclosure of application Serial No. 241,214, there is disclosed a system for completely testing and checking an automotive vehicle in an extremely short period of time and which requires only two attendants or diagnosticians. The system employs a diagnostic bay through which the automotive vehicle to be tested is driven and which bay is provided with equipment for performing various test functions. One of the pieces of test equipment employed in the diagnostic system referred to is a Maxwell dynamometer which includes pairs of spaced rollers associated with driving means and arranged in the floor of the bay to receive the wheels of the test vehicle in cradle fashion. Hence, it is in the environment of such a diagnostic system and particularly with the dynamometer thereof that the present invention is desirable from the standpoint of providing an effective means for detecting wheel unbalance while keeping to a minimum the overall time required to move the test vehicle through the diagnostic bay. However, it is contemplated that the present invention will find application in the more general field of detecting wheel unbalance, apart from such a diagnostic system.

Accordingly, a principal object of the present invention is to provide a new and unique apparatus by which wheel unbalance may be quickly and effectively detected and measured.

Another object of this invention is the provision of an apparatus for detecting wheel unbalance which may be expeditiously employed in the dynamometer of a vehicle diagnostic system to provide an indication of wheel unbalance either simultaneously with the test function served by the dynamometer or which may be employed either before or after carrying out the dynamometer test function but without requiring movement of the vehicle in the bay.

A further object of this invention is to provide a wheel unbalance detecting apparatus which is readily adaptable without substantial adjustment to all sizes of automotive vehicle wheels and as well, to wheels on such vehicles having widely varying weights.

Still another object of the present invention is the provision of an apparatus of the type referred to which is extremely sensitive to wheel unbalance and which provides an accurate indication of the amplitude of vibration caused by unbalance in a wheel rotated at the desired test speed.

In general, the foregoing objects are accomplished in the practice of the present invention by providing a light source and a light-sensitive element on opposite sides of a wheel to be tested such that upon rotation of the wheel and resulting vibration caused by unbalance, the light passing from the source about the periphery of the wheel operates, by means of the light-sensitive element, to produce a modulated, output signal corresponding in amplitude to the amplitude of vibration brought about by rotation of the wheel and thus corresponding to the magnitude of unbalance in the wheel. Preferably, the light source and light-sensitive element are positioned between spaced rollers of a dynamometer on which the wheel is supported by which the desired amount of angular velocity or rotation is imparted to the wheel for testing.

Other objects and further scope of applicability of the present invention will be understood from the detailed description given hereinafter taken in conjunction with the accompanying drawings, in which:

FIG. 1 is a fragmentary perspective view illustrating a vehicle diagnostic bay and particularly the portion thereof containing the dynamometer with which the present invention may be advantageously employed;

Figure 3:
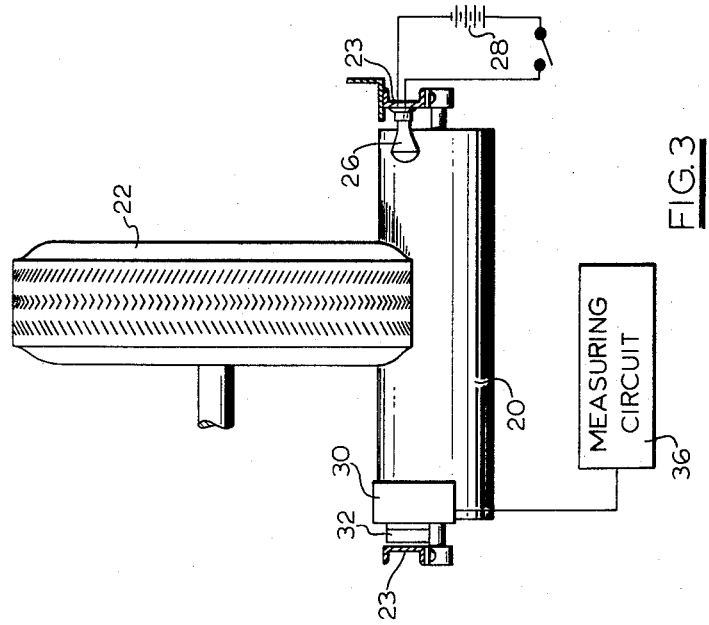
FIG. 3 is a schematic fragmentary cross-sectional view taken along line 3—3 of FIG. 2.
Figure 2:
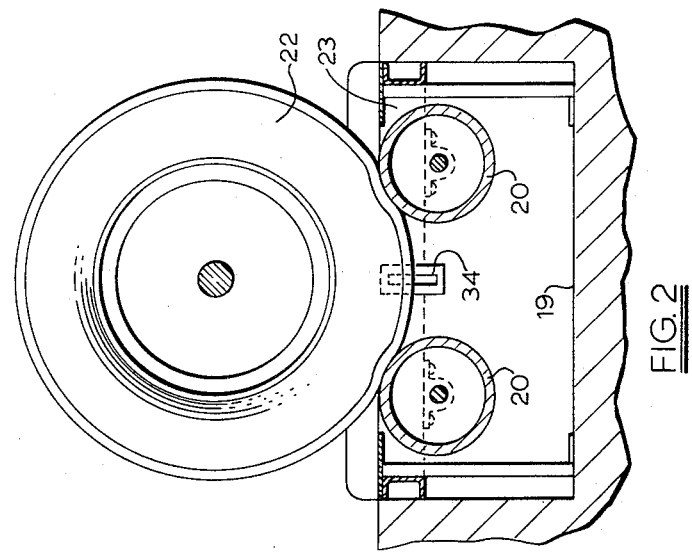
FIG. 2 is an enlarged, schematic cross-section taken along the line 2—2 of FIG. 1 and showing an automotive vehicle wheel in its test position.

Referring now to the drawings, and particularly FIGS. 1-3 thereof, the diagnostic bay in which the present invention is desirably incorporated is generally designated by the reference numeral 10. As described in the above-mentioned copending application, the bay constitutes an enclosure having walls 12, a floor 14, an entrance opening 16 at one end and an exit opening (not shown) at the other end. Also, a Maxwell dynamometer designated generally by the reference numeral 18 is positioned in a well 19 under the level of the floor 14 and toward the entrance end of the bay. The dynamometer itself is conventional and includes pairs of spaced rollers 20 between which the wheels 22 of the test vehicle are supported or cradled during performance of the dynamometer test function. The rollers 20 are suitably journalled in supporting beams 23 of the dynamometer frame structure and at least one roller in each pair is adapted to be rotatably driven by a motor 24. It will be understood that both the diagnostic bay 10 and the Maxwell dynamometer 18, in practice, embody substantially more structural detail than is illustrated in the drawings or described above. Such details, however, are omitted to enable a clear disclosure of the present invention.

As shown in FIGS. 2 and 3 of the drawings, the wheel 22 is in position between the rollers 20 of the Maxwell dynamometer and thus in the proper position both for effecting the dynamometer test function and for employment of the wheel unbalance detecting apparatus of the present invention. This latter apparatus includes a light source 26 positioned on one side of the wheel 22 and suitably supported by mounting, for example, to the frame member 23. For reasons which will become more apparent from the description which follows below, the light 26 is preferably supplied with power from a D.C. source, such as a battery 28. On the opposite side of the wheel 22 from the light 24, a light sensitive element in the form of a photocell 30 is suitably supported such as by a bracket 32 connected to the frame member 23 on that side of the wheel. The photocell functions to provide a modulated signal corresponding in magnitude to the amplitude of wheel vibration due to unbalance therein upon rotation by sensing light passing from the light source 26 about the periphery of the wheel 22. Accordingly, the light sensitive element is rendered elongated in a radial direction with respect to the wheel 22 by the provision of a slit 34 in the chassis within which the photocell 30 is contained. In this manner, the amount of light passing through the slit 34 and thus sensed by the photocell 30 will vary with movement of the wheel periphery due to vibrations caused by unbalance of the wheel. In the preferred form of the invention illustrated in the drawings, the slit 34 defining the operative position of the light sensitive element and the light source 26 are positioned in a vertical plane passing through the center of the wheel 22 and also midway between the axes of the rollers 20. Further, it is preferred that both the photocell 30 and the light source 26 are positioned at the lowermost portion of the wheel or physically between the rollers 20 though it will be understood by those skilled in the art that the photocell 30 and light 26 could be positioned at other points about the periphery of the test wheel 22 for satisfactory operation of the wheel unbalance detecting apparatus of this invention.

The photocell 30 is connected with measuring circuit 36 illustrated schematically in FIG. 3. The measuring circuit 36 removes the D.C. component from the output signal of the photocell and filters out all the A.C. above 20 c.p.s. After this filtering has been carried out, the measuring circuit measures the amplitude of the remaining A.C. signal by converting it to D.C., amplifying the D.C. and applying it to a meter. In operation the rollers 20 are driven by the motor of the dynamometer. In turn, the rollers 20 drive the wheel 22 of the vehicle. The wheel 22 will then vibrate or oscillate with an amplitude proportional to the amount of unbalance in the wheel 22 and as the wheel 22 oscillates it will cut off a portion of the light from the source 26 irradiating the photocell 30 through the slit 34, and the amount of light that is cut off will increase and decrease with the oscillation of the wheel 22. Thus the amount of light that irradiates the photocell through the slit 34 will oscillate with the wheel 22 and with an amplitude equal to the amplitude of oscillation of the wheel 22. Therefore, the photocell 30 will generate an A.C. output signal proportional to the amplitude of oscillation of the wheel 22 and therefore proportional to the amount of unbalance in the wheel 22. The frequency of this A.C. signal will be equal in cycles per second to the revolutions persecond of the wheel 22. The measuring circuit 36 is designed to measure and indicate the amplitude of this A.C. output signal generated by the photocell 30 and thus indicate the amount of unbalance of the wheel 22.

Figure 4:
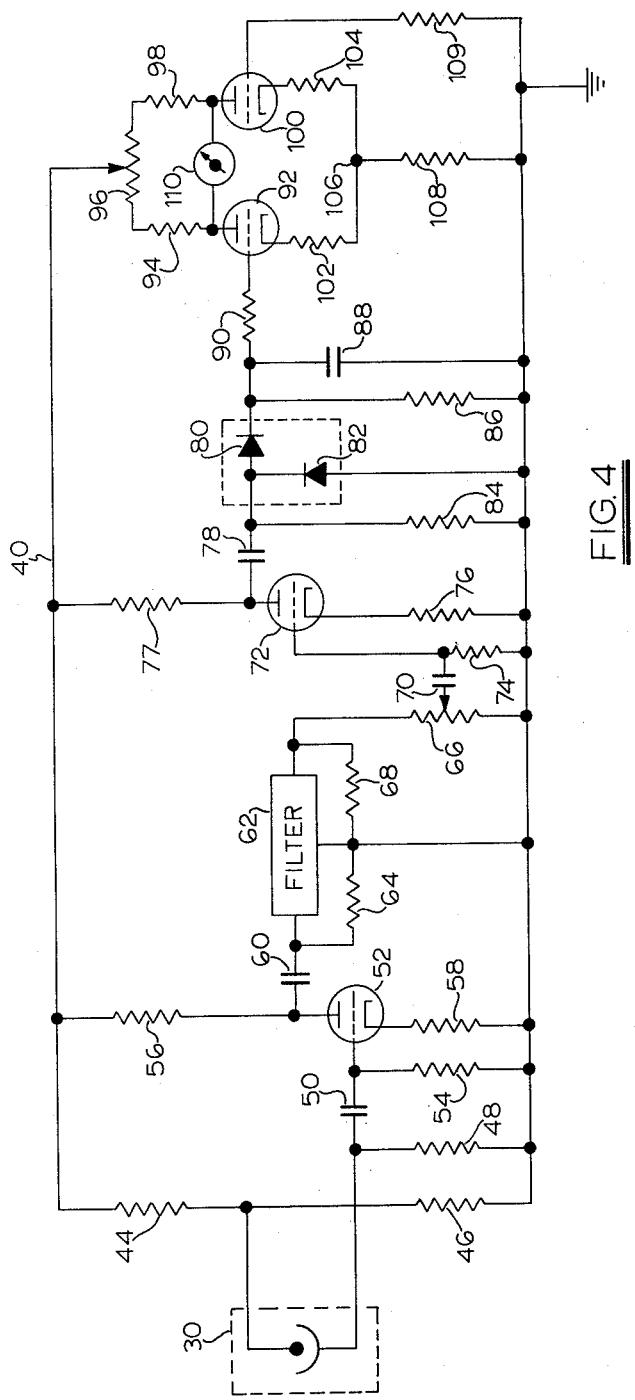
FIG. 4 is a diagrammatic illustration of a measuring circuit adapted for use with the present invention.

Power is applied to the measuring circuit 36, as shown in FIG. 4, in the form of the D.C. voltage applied between the line 40 and the line 42, which is grounded. The positive side of the D.C. voltage is applied to line 40. A voltage divider comprising resistors 44 and 46 are connected in series between the lines 40 and 42 and the anode of the photocell 30 is connected to the junction between the resistors 44 and 46. The cathode of the photocell 30 is connected to the grounded line 42 over a load resistor 48. Thus a portion of the D.C. voltage between lines 40 and 42 will be applied across the photocell 30 and the variation in current in the photocell 30 caused by variations in the irradiating light will cause a corresponding variation in the voltage across the load resistor 48. This signal voltage is applied through a capacitor 50 to the grid of a triode 52, which grid is connected to the ground through a resistor 54. The capacitor 50 removes the D.C. component in the signal voltage produced across the load resistor 48 and only applies to the grid of the tube 52 the A.C. voltage caused by variations in the light irradiating the photocell 30. The plate of the tube 52 is connected to the line 40 over a load resistor 56 and the cathode of the tube 52 is connected to the grounded line 42 over a resistor 58. The triode 52 will amplify the signal voltage applied to its grid and apply the amplified signal voltage through a capacitor 60 to a low pass filter 62. A resistor 64 connects the junction between the capacitor 60 and the filter 62 to the grounded line 42. The filter 62 removes all components in the applied signal voltage from the plate of the tube 52 over 20 cycles per second and applies the remaining signal across the resistance of a potentiometer 66. The junction between the filter 62 and the potentiometer 66 is connected to the grounded line 42 over a resistor 68. The movable contact of the potentiometer 66 is connected through a capacitor 70 to the grid of a triode 72. Thus the potentiometer 66 attenuates the output signal from the filter 62 a selectively variable amount and applies it to the grid of the triode 72. The grid of the triode 72 is connected to the grounded line of 42 over a resistor 74. The cathode of the triode 72 is connected to the line 42 over a resistor 76 and the plate of the triode 72 is connected to the line 40 over a load resistor 77. The triode 72 amplifies the attenuated output voltage produced at the movable contact of the potentiometer 66 and applies it through a capacitor 78 to the anode of a diode rectifier 80 and the cathode of a diode rectifier 82, the anode of which is connected to the grounded line 42. The junction between the capacitor 78 and the diode rectifiers 80 and 82 is connected to ground through a load resistor 84. The diode rectifiers 80 and 82 convert the A.C. signal voltage applied thereto from the plate of the triode 72 to a D.C. signal voltage, which is produced across a load resistor 86. The load resistor 86, which is connected between the cathode of the diode rectifier 80 and the grounded line 42, is connected in parallel with a capacitor 88, which removes the ripple from the rectified D.C. voltage. The D.C. voltage signal produced across the resistor 86 and the capacitor 88 is applied through a resistor 90 to the grid of a triode 92. The plate of the triode 92 is connected through a load resistor 94 to one side of a potentiometer 96, the other side of which is connected through a load resistor 98 to the plate of a triode 100. The movable contact of the potentiometer 96 is connected directly to the line 40. The cathodes of the triodes 92 and 100 are connected through resistors 102 and 104, respectively, to a junction 106, which is connected to the grounded line 42 through a resistor 108. The grid of the anode 100 is connected to the grounded line 42 through a resistor 109. The triodes 92 and 100 together with the resistors 94, 98, 102, 104, 108, and 109 and the potentiometer 96 comprise a differential amplifier connected to amplify the D.C. voltage produced across the resistor 86 and the capacitor 88. The amplified D.C. output voltage of the differential amplifier is produced between the plates of the triodes 92 and 100. A meter 110 is connected between the plates of the triodes 92 and 100 to provide an indication of this output voltage.

Thus the signal generated by the photocell 30, after having the D.C. component removed therefrom by the capacitor 50 will be amplified by the triode 52, and then be filtered by the filter 62 to remove all components above 20 c.p.s. Thus the output signal from the filter 62 will be an A.C. signal proportional to the A.C. components generated in the photocell 30 below 20 c.p.s. This A.C. signal is attenuated a selectively variable amount by the potentiometer 66 and then amplified again by the triode 72. After being amplified by the triode 72 the A.C. signal is converted to a D.C. signal voltage by the diode rectifiers 80 and 82 and applied across the parallel circuit of the resistor 86 and the capacitor 88. Thus the D.C. voltage produced across the resistor 86 and the capacitor 88 will be proportional to the A.C. components generated in the photocell 30 below 20 cycles per second. The D.C. signal voltage produced across the resistor 86 and the capacitor 88 will be amplified by the differential amplifier comprising the triodes 92 and 100 and then be indicated by the meter 110. Thus the meter 110 will provide an indication of the amplitude of the A.C. components produced in the photocell 30 below 20 cycles per second.

As pointed out above, the photocell 30 when the wheel 22 is being driven by the rollers 20 will generate an A.C.

signal voltage proportional to the amount of unbalance in the wheel 22. This A.C. signal generated by the photocell 30 will have a frequency equal to the revolutions per second that the wheel 22 is driven by the rollers 20. In the preferred embodiment of the invention, the rollers 20 drive the wheel 22 at 57 to 60 miles per hour. When the wheel 22 is being driven by the rollers 20 at 57 to 60 miles per hour, it will be rotating at less than 20 revolutions per second. This is true for all sizes of vehicle wheels. The photocell 30, in addition to generating the A.C. signal at the frequency equal to the revolutions per second of the wheel 22, also generates a substantial amount of higher frequency signals. However, substantially no A.C. signals other than the one caused by and proportional to the unbalance of the wheel 22 will be generated by the photocell 30 below 20 cycles per second. Thus the output signal produced by the filter 62 will be directly proportional to the amount of unbalance in the wheel 22 and the meter 110 will directly indicate the amount of unbalance in the wheel 22.

The above description is of a preferred embodiment of the invention, and many modifications may be made thereto without departing from the spirit and scope of the invention, which is defined in the appended claims.

What is claimed is:

1. Apparatus for detecting wheel unbalance of a wheel having a resilient periphery comprising: a pair of spaced rollers for supporting and rotatably driving the wheel; a light source positioned on one side of the wheel supported on said rollers; and means responsive to light passing from said source about the peripheral edge of the wheel during rotation thereof for producing a modulated signal corresponding in amplitude to the amplitude of vibrations due to wheel unbalance.

2. Apparatus for detecting wheel unbalance of a wheel having a resilient periphery comprising: a roller for supporting and rotatably driving a wheel to be tested for unbalance; a light source positioned on one side of the supported wheel; and means responsive to light passing from said light source about the peripheral edge of the wheel during rotation thereof for producing a modulated signal corresponding in amplitude to the amplitude of vibrations due to wheel unbalance.

3. The apparatus recited in claim 1 wherein said light source and said responsive means are positioned between said rollers on opposite sides of the wheel supported thereon.

4. The apparatus recited in claim 2 in which said light responsive means includes a light sensitive element positioned on the opposite side of the supported wheel from said light source, said element being elongated in a radial direction with respect to the wheel.

5. Apparatus for detecting unbalance in automotive vehicle wheels having resilient tires on their peripheries comprising: a pair of spaced rollers for supporting and rotatably driving the wheel to be tested for unbalance; a light source positioned on one side of the supported wheel and in a substantially vertical plane passing through the supported wheel center; a light sensitive element positioned on the opposite side of the supported wheel from said light source, said element being elongated and extending in substantially the same vertical plane in which said light source is positioned; and means connected to said light sensitive element for producing a modulating signal corresponding in amplitude to the amplitude of vibrations due to wheel unbalance.

6. Testing apparatus for automotive vehicle wheels having resilient tires on their peripheries comprising in combination: a dynamometer having a pair of spaced rollers for supporting the vehicle wheel to be tested; and means for detecting wheel unbalance, said means including a light source positioned on one side of the wheel and between said spaced rollers, a light sensitive element positioned on the opposite side of the wheel from said light source, and means connected to said light sensitive element for producing a modulated signal corresponding in amplitude to the amplitude of vibrations due to wheel unbalance.

7. Apparatus for detecting wheel unbalance of a wheel having a resilient periphery comprising: a roller for supporting and rotatably driving a wheel to be tested for unbalance; a light source positioned on one side of the supported wheel; means to generate a signal proportional to the amount of light passing from said light source about the peripheral edge of the wheel during rotation thereof, and means to filter out all components in said signal above a predetermined frequency.

8. Apparatus for detecting wheel unbalance of a wheel having a resilient periphery comprising: a roller for supporting and rotatably driving a wheel to be tested for unbalance; a light source positioned on one side of the supported wheel; means to generate a signal proportional to the amount of light passing from said light source about the peripheral edge of the wheel during rotation thereof, means to filter out all components in said signal above a predetermined frequency, and means to indicate the amplitude of the resulting filtered signal.

9. Apparatus for detecting the unbalance of a wheel having a resilient periphery comprising a pair of rollers positioned and arranged to support and engage the periphery of the wheel to be tested for unbalance, and means for sensing the amplitude of the deflection of the periphery of the wheel during rotation between said rollers and relative to said rollers.

10. Apparatus for detecting the unbalance of a wheel having a resilient periphery comprising a roller positioned and arranged to support and engage the periphery of the wheel to be tested for unbalance, and means for sensing the amplitude of the deflection of the wheel during rotation relative to said roller due to unbalance of the wheel.

11. Apparatus for detecting unbalance of a wheel having a resilient periphery comprising a roller for supporting and rotatably engaging the periphery of the wheel to be tested for unbalance and for rotatably driving said wheel, and means for sensing the amplitude of deflection of said wheel during rotation relative to said roller due to unbalance of said wheel.

12. Apparatus for detecting the unbalance of a wheel including a resilient tire on the periphery thereof comprising a roller for supporting and rotatably engaging the periphery of the resilient tire of the wheel to be tested for unbalance and means for sensing the amplitude of deflection of the periphery of said tire relative to said engaging means at a point adjacent said engaging means.

13. An apparatus for detecting the unbalance of a wheel as recited in claim 10, wherein said means for sensing the amplitude of deflection of said wheel comprises a light source positioned on one side of the supported wheel and means responsive to light passing from said source about the peripheral edge of the wheel during rotation thereof for producing a modulated signal corresponding in amplitude to the amplitude of vibrations of said wheel due to wheel unbalance.

14. A method of testing the unbalance of a wheel including a resilient tire on its periphery comprising the steps of pressing the periphery of said wheel against a roller having a fixed axis, rotating said wheel at a high speed while maintaining the periphery of said wheel pressed against said roller so that any unbalance of said wheel will cause said wheel to oscillate relative to said roller with the oscillation being opposed by the resilient force of the tire of said wheel, and sensing the amplitude of deflection of said wheel relative to said roller in a direction extending radially from said wheel toward said roller.

15. A method of testing the unbalance of a wheel including a resilient tire on its periphery comprising the steps of pressing the periphery of said wheel against a roller having a fixed axis, supporting said wheel with said roller, rotating said wheel at a high speed while maintaining the periphery of said wheel pressed against said roller and while maintaining said wheel supported by said roller so that any unbalance of said wheel will cause said wheel to oscillate relative to said roller with the oscillation being opposed by the resilient force of the tire of said wheel, and sensing the amplitude of deflection of said wheel relative to said roller in the direction extending radially from said wheel toward said roller.

16. A method of testing the unbalance of a wheel including a resilient tire as recited in claim 14 wherein the step of sensing the amplitude of deflection of the wheel comprises shining a beam of light from one side of the wheel on the peripheral edge of the wheel, sensing the light passing about the peripheral edge of said wheel, and generating a modulated signal corresponding in amplitude to the modulation of the amount of light passing about the peripheral edge of said wheel resulting from the vibration of the wheel due to wheel unbalance.

References Cited by the Examiner

UNITED STATES PATENTS

| | | | |
|---|---|---|---|
| 2,290,606 | 7/1942 | Burnett | 73—465 |
| 2,341,443 | 2/1944 | Hunter | 73—457 |
| 2,403,513 | 7/1946 | Forsberg | 73—462 |
| 2,433,558 | 12/1947 | Hurley | 33—178 |
| 2,441,343 | 5/1948 | Becker | 33—178 |
| 2,451,863 | 10/1948 | Oakley | 73—457 |
| 2,854,757 | 10/1958 | Roeger | 73—462 |
| 3,078,720 | 2/1963 | Hofmann | 73—457 |

FOREIGN PATENTS

| | | |
|---|---|---|
| 124,667 | 9/1931 | Austria. |
| 1,227,800 | 3/1960 | France. |
| 1,305,381 | 8/1962 | France. |
| 338,847 | 7/1921 | Germany. |

OTHER REFERENCES

German application 1,112,659, August 10, 1961.
German application 1,115,054, October 12, 1961.

RICHARD C. QUEISSER, *Primary Examiner.*

JAMES J. GILL, *Examiner.*